(12) United States Patent
Godwin et al.

(10) Patent No.: US 7,107,350 B2
(45) Date of Patent: *Sep. 12, 2006

(54) METHODS, SYSTEMS AND COMPUTER PROGRAM PRODUCTS FOR SECURITY PROCESSING OUTBOUND COMMUNICATIONS IN A CLUSTER COMPUTING ENVIRONMENT

(75) Inventors: James Russell Godwin, Raleigh, NC (US); Linwood H. Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

This patent is subject to a terminal disclaimer.

(21) Appl. No.: 09/764,616

(22) Filed: Jan. 17, 2001

(65) Prior Publication Data

US 2002/0133602 A1    Sep. 19, 2002

(51) Int. Cl.
*G06F 13/00* (2006.01)
(52) U.S. Cl. .................... 709/230; 709/245; 713/201
(58) Field of Classification Search ............. 709/230, 709/245; 713/200, 201
See application file for complete search history.

(56) References Cited

U.S. PATENT DOCUMENTS

| 4,403,286 | A  | 9/1983  | Fry et al. |
|-----------|----|---------|------------|
| 4,495,570 | A  | 1/1985  | Kitajima et al. |
| 4,577,272 | A  | 3/1986  | Ballew et al. |
| 5,031,089 | A  | 7/1991  | Liu et al. |
| 5,675,739 | A  | 10/1997 | Eilert et al. |
| 5,917,997 | A  | 6/1999  | Bell et al. |
| 5,923,854 | A  | 7/1999  | Bell et al. |
| 5,935,215 | A  | 8/1999  | Bell et al. ............ 709/239 |
| 5,951,650 | A  | 9/1999  | Bell et al. ............ 709/238 |
| 6,430,622 | B1 | 8/2002  | Aiken, Jr. et al. ...... 709/245 |
| 6,438,612 | B1*| 8/2002  | Ylonen et al. ......... 709/249 |
| 6,697,857 | B1*| 2/2004  | Dixon et al. .......... 709/224 |
| 2002/0046348 | A1*| 4/2002 | Brustoloni ............ 713/201 |
| 2002/0095496 | A1 | 7/2002 | Godwin et al. ........ 709/225 |
| 2002/0095603 | A1 | 7/2002 | Godwin et al. ........ 713/201 |
| 2003/0018813 | A1 | 1/2003 | Antes et al. ........... 709/245 |

OTHER PUBLICATIONS

D. Harkins et al.; The Internet Key Exchange (IKE); RFC 2409; pp. 1-36; Nov. 1998.*
A. Dahlin, et al. *EDDIE A Robust and Scalable Internet Server.* Ericsson Telecom AB, Stockholm, Sweden (May 1998).
Brochure entitled, *ACEdirector™ 8-PORT 10/100 MBPS Ethernet Switch.* Alteon WebSystems, San Jose, CA (1999).
Brochure entitled, *Enhancing Web User Experience with Global Server Load Balancing.* Alteon WebSystems, San Jose, CA (Jun. 1999).

(Continued)

*Primary Examiner*—Kenneth R. Coulter
(74) *Attorney, Agent, or Firm*—Myers Bigel Sibley & Sajovec, P.A.

(57) ABSTRACT

Methods, systems and computer program products provide Internet Protocol Security (IPSec) to a plurality of target hosts in a cluster of data processing systems which communicate with a network through a routing communication protocol stack utilizing a dynamically routable Virtual Internet Protocol Address (DVIPA) for communications from the plurality of target hosts by negotiating security associations (SAs) associated with the DVIPA utilizing an Internet Key Exchange (IKE) component associated with the routing communication protocol stack and distributing information about the negotiated SAs to the target hosts so as to allow the target hosts to perform IPSec processing of communications to the network utilizing the negotiated SAs. Communications to the network are IPSec processed utilizing the distributed information at communication protocol stacks at respective ones of the plurality of target hosts.

33 Claims, 11 Drawing Sheets

OTHER PUBLICATIONS

Brochure entitled, *The Next Step in Server Load Balancing*. Alteon WebSystems, San Jose, CA (Nov. 1999).

Mac Devine. Presentation entitled, *TCP/IP Application Availability and Workload Balancing in the Parallel Sysplex*. Share Technical Conference (Aug. 22-27, 1999).

http://w3.enterlib.ibm.com:80/cgi-bin/bookmgr/books/FIAF7001/1.3.1.2; 1.3.1.2.5. Virtual IP Addressing (VIPA); Excerpt from IP Configuration for OS/390, pp. 1-4 (1998).

http://w3.enterlib.ibm.com:80/cgi-bin/bookmgr/books/FIAF7001/1.3.2; 1.3.20 Device and Link Statement—Virtual Devices (VIPA); Excerpt from IP Configuration for OS/390, pp. 1-3 (1998).

http://w3.enterlib.ibm.com:80/cgi-bin/bookmgr/books/FIAF7001/1.3.2; 1.3.23. HOME Statement; Excerpt from IP Configuration for OS/390, pp. 1-6 (1998).

Martin W. Murhammer, et al. *A Comprehensive Guide to Virtual Private Networks, vol. III: Cross-Platform Key and Policy Management*. 1999, Chapters 1-3, pp. 1-71.

U.S. Appl. No. 09/640,409, filed Aug. 17, 2000, entitled "Methods, Systems and Computer Program Products for Cluster Workload Distribution".

U.S. Appl. No. 09/640,438, filed Aug. 17, 2000, entitled "Methods, Systems and Computer Program Products for Failure Recovery for Routed Virtual Internet Protocol Addresses".

U.S. Appl. No. 09/640,412, filed Aug. 17, 2000, entitled "Methods, Systems and Computer Program Products for Non-Disruptively Transferring a Virtual Internet Protocol Address Between Communication Protocol Stacks".

\* cited by examiner

METHODS, SYSTEMS AND COMPUTER PROGRAM PRODUCTS FOR SECURITY PROCESSING OUTBOUND COMMUNICATIONS IN A CLUSTER COMPUTING ENVIRONMENT

RELATED APPLICATIONS

The present application is related to commonly assigned and concurrently filed U.S. patent application Ser. No. 09/764,613, entitled "METHODS, SYSTEMS AND COMPUTER PROGRAM PRODUCTS FOR SECURITY PROCESSING INBOUND COMMUNICATIONS IN A CLUSTER COMPUTING ENVIRONMENT" the disclosure of which is incorporated by reference as if set forth fully herein.

FIELD OF THE INVENTION

The present invention relates to network communications and more particularly to network communications to a cluster of data processing systems.

BACKGROUND OF THE INVENTION

The Internet Protocol (IP) is a connectionless protocol. IP packets are routed from an originator through a network of routers to the destination. All physical adapter devices in such a network, including those for client and server hosts, are identified by an IP Address which is unique within the network. One valuable feature of IP is that a failure of an intermediate router node or adapter will not prevent a packet from moving from source to destination, as long as there is an alternate path through the network.

In Transmission Control Protocol/Internet Protocol (TCP/IP), TCP sets up a connection between two endpoints, identified by the respective IP addresses and a port number on each. Unlike failures of an adapter in an intermediate node, if one of the endpoint adapters (or the link leading to it) fails, all connections through that adapter fail, and must be reestablished. If the failure is on a client workstation host, only the relatively few client connections are disrupted, and usually only one person is inconvenienced. However, an adapter failure on a server means that hundreds or thousands of connections may be disrupted. On a System/390 with large capacity, the number may run to tens of thousands.

To alleviate this situation, International Business Machines Corporation introduced the concept of a Virtual IP Address, or VIPA, on its TCP/IP for OS/390 V2R5 (and added to V2R4 as well). Examples of VIPAs and their user may be found in U.S. Pat. Nos. 5,917,997, 5,923,854, 5,935,215 and 5,951,650. A VIPA is configured the same as a normal IP address for a physical adapter, except that it is not associated with any particular device. To an attached router, the TCP/IP stack on System/390 simply looks like another router. When the TCP/IP stack receives a packet destined for one of its VIPAs, the inbound IP function of the TCP/IP stack notes that the IP address of the packet is in the TCP/IP stack's Home list of IP addresses and forwards the packet up the TCP/IP stack. The "home list" of a TCP/IP stack is the list of IP addresses which are "owned" by the TCP/IP stack. Assuming the TCP/IP stack has multiple adapters or paths to it (including a Cross Coupling Facility (XCF) path from other TCP/IP stacks in a Sysplex), if a particular physical adapter fails, the attached routing network will route VIPA-targeted packets to the TCP/IP stack via an alternate route. The VIPA may, thus, be thought of as an address to the stack, and not to any particular adapter.

While the use of VIPAs may remove hardware and associated transmission media as a single point of failure for large numbers of connections, the connectivity of a server can still be lost through a failure of a single stack or an MVS image. The VIPA Configuration manual for System/390 tells the customer how to configure the VIPA(s) for a failed stack on another stack, but this is a manual process. Substantial down time of a failed MVS image or TCP/IP stack may still result until operator intervention to manually reconfigure the TCP/IP stacks in a Sysplex to route around the failed TCP/IP stack or MVS image.

While merely restarting an application with a new IP address may resolve many failures, applications use IP addresses in different ways and, therefore, such a solution may be inappropriate. The first time a client resolves a name in its local domain, the local Dynamic Name Server (DNS) will query back through the DNS hierarchy to get to the authoritative server. For a Sysplex, the authoritative server should be DNS/Workload Manager (WLM). DNS/WLM will consider relative workloads among the nodes supporting the requested application, and will return the IP address for the most appropriate available server. IP addresses for servers that are not available will not be returned. The Time to Live of the returned IP address will be zero, so that the next resolution query (on failure of the original server, for example) will go all the way back to the DNS/WLM that has the knowledge to return the IP address of an available server.

However, in practice, things do not always work as described above. For example, some clients are configured to a specific IP address, thus requiring human intervention to go to another server. However, the person using the client may not have the knowledge to reconfigure the client for a new IP address. Additionally, some clients ignore the Time to Live, and cache the IP address as long as the client is active. Human intervention may again be required to recycle the client to obtain a new IP address. Also, DNSs are often deployed as a hierarchy to reduce network traffic, and DNSs may cache the IP address beyond the stated Time to Live even when the client behaves quite correctly. Thus, even if the client requests a new IP address, the client may receive the cached address from the DNS. Finally, some users may prefer to configure DNS/WLM to send a Time to Live that is greater than zero, in an attempt to limit network-wide traffic to resolve names. Problems arising from these various scenarios may be reduced if the IP address with which the client communicates does not change. However, as described above, to affect such a movement of VIPAs between TCP/IP stacks requires operator intervention and may result in lengthy down times for the applications associated with the VIPA.

Previous approaches to increased availability focused on providing spare hardware. The High-Availability Coupled Multi-Processor (HACMP) design allows for taking over the MAC address of a failing adapter on a shared medium (LAN). This works both for a failing adapter (failover to a spare adapter on the same node) or for a failing node (failover to another node via spare adapter or adapters on the takeover node.) Spare adapters are not used for IP traffic, but they are used to exchange heartbeats among cluster nodes for failure detection. All of the work on a failing node goes to a single surviving node. In addition to spare adapters and access to the same application data, the designated failover node must also have sufficient spare processing capacity to handle the entire failing node workload with "acceptable" service characteristics (response and throughput).

Automatic restart of failing applications also provides faster recovery of a failing application or node. This may be acceptable when the application can be restarted in place, but is less useful when the application is moved to another node, unless the IP address known to the clients can be moved with the application, or dynamic DNS updates with alternate IP addresses can be propagated to a DNS local to clients sufficiently quickly.

Other attempts at error recovery have included the EDDIE system described in a paper titled "EDDIE, A Robust and Scalable Internet Server" by A. Dahlin, M. Froberg, J. Grebeno, J. Walerud, and P. Winroth, of Ericsson Telecom AB, Stockholm, Sweden, May 1998. In the EDDIE approach, a distributed application called "IP Address Migration Application" controls all IP addresses in the cluster. The cluster is connected via a shared-medium LAN. IP address aliasing is used to provide addresses to individual applications over a single adapter, and these aliases are located via the Address Resolution Protocol (ARP) and ARP caches in the TCP/IPs. The application monitors all server applications and hardware, and reallocates aliased IP addresses, in the event of failure, to surviving adapters and nodes. This approach allows applications of a failing node to be distributed among surviving nodes, but it may require the monitoring application to have complete knowledge of the application and network adapter topology in the cluster. In this sense, it is similar to existing Systems Management applications such as those provided by International Business Machines Corporation's Tivoli® network management software, but the IP Address Migration Application has direct access to adapters and ARP caches. The application also requires a dedicated IP address for inter-application communication and coordination.

U.S. patent application Ser. No. 09/401,419 entitled "METHODS, SYSTEMS AND COMPUTER PROGRAM PRODUCTS FOR AUTOMATED MOVEMENT OF IP ADDRESSES WITHIN A CLUSTER" filed Sep. 22, 1999, the disclosure of which is incorporated herein by reference as if set forth fully herein, describes dynamic virtual IP addresses (VIPA) and their use. As described in the '419 application, a dynamic VIPA may be automatically moved from protocol stack to protocol stack in a predefined manner to overcome failures of a particular protocol stack (i.e. VIPA takeover). Such a predefined movement may provide a predefined backup protocol stack for a particular VIPA. VIPA takeover was made available by International Business Machines Corporation (IBM), Armonk, N.Y., in System/390 V2R8 which had a general availability date of September, 1999.

In addition to failure scenarios, scalability and load balancing are also issues which have received considerable attention in light of the expansion of the Internet. For example, it may be desirable to have multiple servers servicing customers. The workload of such servers may be balanced by providing a single network visible IP address which is mapped to multiple servers.

Such a mapping process may be achieved by, for example, network address translation (NAT) facilities, dispatcher systems and IBM's Dynamic Name Server/Workload Management DNS/WLM systems. These various mechanisms for allowing multiple servers to share a single IP address are illustrated in FIGS. 1 through 3.

FIG. 1 illustrates a conventional network address translation system as described above. In the system of FIG. 1, a client 10 communicates over a network 12 to a network address translation system 14. The network address translation system receives the communications from the client 10 and converts the communications from the addressing scheme of the network 12 to the addressing scheme of the network 12' and sends the messages to the servers 16. A server 16 may be selected from multiple servers 16 at connect time and may be on any host, one or more hops away. All inbound and outbound traffic flows through the NAT system 14.

FIG. 2 illustrates a conventional DNS/WLM system as described above. As mentioned above, the server 16 is selected at name resolution time when the client 10 resolves the name for the destination server from DNS/WLM system 17 which is connected to the servers 16 through the coupling facility 19 and to the network 12. As described above, the DNS/WLM system of FIG. 2 relies on the client 10 adhering to the zero time to live.

FIG. 3 illustrates a conventional dispatcher system. As seen in FIG. 3, the client 10 communicates over the network 12 with a dispatcher system 18 to establish a connection. The dispatcher routes inbound packets to the servers 16 and outbound packets are sent over network 12' but may flow over any available path to the client 10. The servers 16 are typically on a directly connected network to the dispatcher 18 and a server 16 is selected at connect time.

Such a dispatcher system is illustrated by the Interactive Network Dispatcher function of the IBM 2216 and AIX platforms. In these systems, the same IP address that the Network Dispatcher node 18 advertises to the routing network 12 is activated on server nodes 16 as a loopback addresses. The node performing the distribution function connects to the endpoint stack via a single hop connection because normal routing protocols typically cannot be used to get a connection request from the endpoint to the distributing node if the endpoint uses the same IP address as the distributing node advertises. Network Dispatcher uses an application on the server to query a workload management function (such as WLM of System/390), and collects this information at intervals, e.g. 30 seconds or so. Applications running on the Network Dispatcher node can also issue "null" queries to selected application server instances as a means of determining server instance health.

In addition to the above described systems, Cisco Systems offers a Multi-Node Load Balancing function on certain of its routers that perform the distribution function. Such operations appear similar to those of the IBM 2216.

In addition to the system described above, AceDirector from Alteon provides a virtual IP address and performs network address translation to a real address of a selected server application. AceDirector appears to observe connection request turnaround times and rejection as a mechanism for determining server load capabilities.

A still further consideration which has arisen as a result of increased use of the Internet is security. Recently, the Internet has seen an increase in use of Virtual Private Networks which utilize the Internet as a communications media but impose security protocols onto the Internet to provide secure communications between network hosts. Typically, these security protocols are intended to provide "end-to-end" security in that secure communications are provided for the entire communications path between two host processing systems. However, Internet security protocols, which are typically intended to provide "end-to-end" security between a source IP address and a destination IP address, may present difficulties for load balancing and failure recovery.

As an example, the Internet Protocol Security Architecture (IPSec), is a Virtual Private Network (VPN) technology that operates on the network layer (layer 3) in conjunction with an Internet Key Exchange (IKE) protocol component that operates at the application layer (layer 5 or higher). IPSec uses symmetric keys to secure traffic between peers. These symmetric keys are generated and distributed by the IKE function. IPSec uses security associations (SAs) to provide security services to traffic. SAs are unidirectional logical connections between two IPSec systems which may be uniquely identified by the triplet of <Security Parameter Index, IP Destination Address, Security Protocol>. To provide bidirectional communications, two SAs are defined, one in each direction.

SAs are managed by IPSec systems maintaining two databases; a Security Policy Database (SPD) and a Security Associations Database (SAD). The SPD specifies what security services are to be offered to the IP traffic. Typically, the SPD contains an ordered list of policy entries which are separate for inbound and outbound traffic. These policies may specify, for example, that some traffic must not go through IPSec processing, some traffic must be discarded and some traffic must be IPSec processed.

The SAD contains parameter information about each SA. Such parameters may include the security protocol algorithms and keys for Authentication Header (AH) or Encapsulating Security Payload (ESP) security protocols, sequence numbers, protocol mode and SA lifetime. For outbound processing, an SPD entry points to an entry in the SAD. In other words, the SPD determines which SA is to be used for a given packet. For inbound processing, the SAD is consulted to determine how the packet is processed.

As described above, IPSec provides for two types of security protocols, Authentication Header (AH) and Encapsulating Security Payload (ESP). AH provides origin authentication for an IP datagram by incorporating an AH header which includes authentication information. ESP encrypts the payload of an IP packet using shared secret keys. A single SA may be either AH or ESP but not both. However, multiple SAs may be provided with differing protocols. For example, two SAs could be established to provide both AH and ESP protocols for communications between two hosts.

IPSec also supports two modes of SAs; transport mode and tunnel mode. In transport mode, an IPSec header is inserted into the IP header of the IP datagram. In the case of ESP, a trailer and optional ESP authentication data are appended to the end of the original payload. In tunnel mode, a new IP datagram is constructed and the original IP datagram is made the payload of the new IP datagram. IPSec in transport mode is then applied to the new IP datagram. Tunnel mode is typically used when either end of a SA is a gateway.

SAs are negotiated between the two endpoints of the SA and may, typically, be established through prior negotiations or dynamically. IKE may be utilized to negotiate a SA utilizing a two phase negotiation. In phase 1, an Internet Security Association and Key Management Protocol (ISAKMP) security association is established. It is assumed that a secure channel does not exist and, therefore, one is established to protect the ISAKMP messages. This security association in owned by ISAKMP. During phase 1, the partners exchange proposals for the ISAKMP security association and agree on one. The partners then exchange information for generating a shared master secret. Both parties then generate keying material and shared secrets before exchanging additional authentication information.

In phase 2, subsequent security associations for other services are negotiated. The ISAKMP security association is used to negotiate the subsequent SAs. In phase 2, the partners exchange proposals for protocol SAs and agree on one. To generate keys, both parties use the keying material from phase 1 and may, optionally, perform additional exchanges. Multiple phase 2 exchanges may be provided under the same phase 1 protection.

Once phase 1 and phase 2 exchanges have successfully completed, the peers have reached a state where they can start to protect traffic with IPSec according to applicable policies and traffic profiles. The peers would then have agreed on a proposal to authenticate each other and to protect future IKE exchanges, exchanged enough secret and random information to create keying material for later key generation, mutually authenticated the exchange, agreed on a proposal to authenticate and protect data traffic with IPSec, exchanged further information to generate keys for IPSec protocols, confirmed the exchange and generated all necessary keys.

With IPSec in place, for host systems sending outbound packets, the SPD is consulted to determine if IPSec processing is required or if other processing or discarding of the packet is to be performed. If IPSec is required, the SAD is searched for an existing SA for which the packet matches the profile. If no SA is found, a new IKE negotiation is started that results in the desired SA being established. If an SA is found or after negotiation of an SA, IPSec is applied to the packet as defined by the SA and the packet is delivered.

For packets inbound to a host system, if IPSec is required, the SAD is searched for an existing security parameter index to match the security parameter index of the inbound packet. If no match is found the packet is discarded. If a match is found, IPSec is applied to the packet as required by the SA and the SPD is consulted to determine if IPSec or other processing is required. Finally, the payload is delivered to the local process.

In light of the above discussion, various of the workload distribution methods described above may have compatibility problems with IPSec.

SUMMARY OF THE INVENTION

Embodiments of the present invention provide methods, systems and computer program products for providing Internet Protocol Security (IPSec) to a plurality of target hosts in a cluster of data processing systems which communicate with a network through a routing communication protocol stack utilizing a dynamically routable Virtual Internet Protocol Address (DVIPA) for communications from the plurality of target hosts. Security associations (SAs) associated with the DVIPA utilizing an Internet Key Exchange (IKE) component associated with the routing communication protocol stack are negotiated and information about the negotiated SAs distributed to the target hosts so as to allow the target hosts to perform IPSec processing of communications to the network utilizing the negotiated SAs. Communications to the network are IPSec processed utilizing the distributed information at communication protocol stacks at respective ones of the plurality of target hosts.

In particular embodiments of the present invention, distributed SA information is stored in a shadow SA cache at the target hosts. The distributed information may include dynamic filters associated with the negotiated SAs which may be installed in communication protocol stacks at respective ones of the plurality of target hosts. IPSec processing of outbound communications may be provided by locating an SA stored in the shadow SA cache which is associated with an outbound communication and IPSec processing the outbound communication utilizing the located SA.

In still further embodiments of the present invention, the processed outbound communication is sent to the network without routing the outbound communication through the routing communication protocol stack.

Additionally, an IPSec sequence number associated with the determined SA may be obtained and the outbound communication IPSec processed utilizing the located SA and the obtained IPSec sequence number. In particular, the IPSec sequence number may be obtained from a coupling facility. Also, a plurality of IPSec sequence numbers for a plurality of outbound communications may be obtained.

In further embodiments of the present invention, an outbound lifesize count is provided to the routing communication protocol stack. In such embodiments, the IKE may refresh the SAs associated with the DVIPA based on the outbound lifesize count reaching a threshold. Furthermore, the outbound lifesize count may be provided by sending a cross coupling facility (XCF) message identifying the outbound lifesize count to the routing communication protocol stack. Such messages may be periodically sent identifying the outbound lifesize count for a plurality of IPSec processed communications. In particular, the plurality of IPSec processed communications may be a percentage of a total lifesize count associated with an SA. The percentage of the total lifesize may be dynamically established based on whether the IKE has previously refreshed the SA prior to expiration of the lifesize count threshold associated with the SA.

As will further be appreciated by those of skill in the art, the present invention may be embodied as methods, apparatus/systems and/or computer program products.

DETAILED DESCRIPTION OF THE INVENTION

Figure 1:
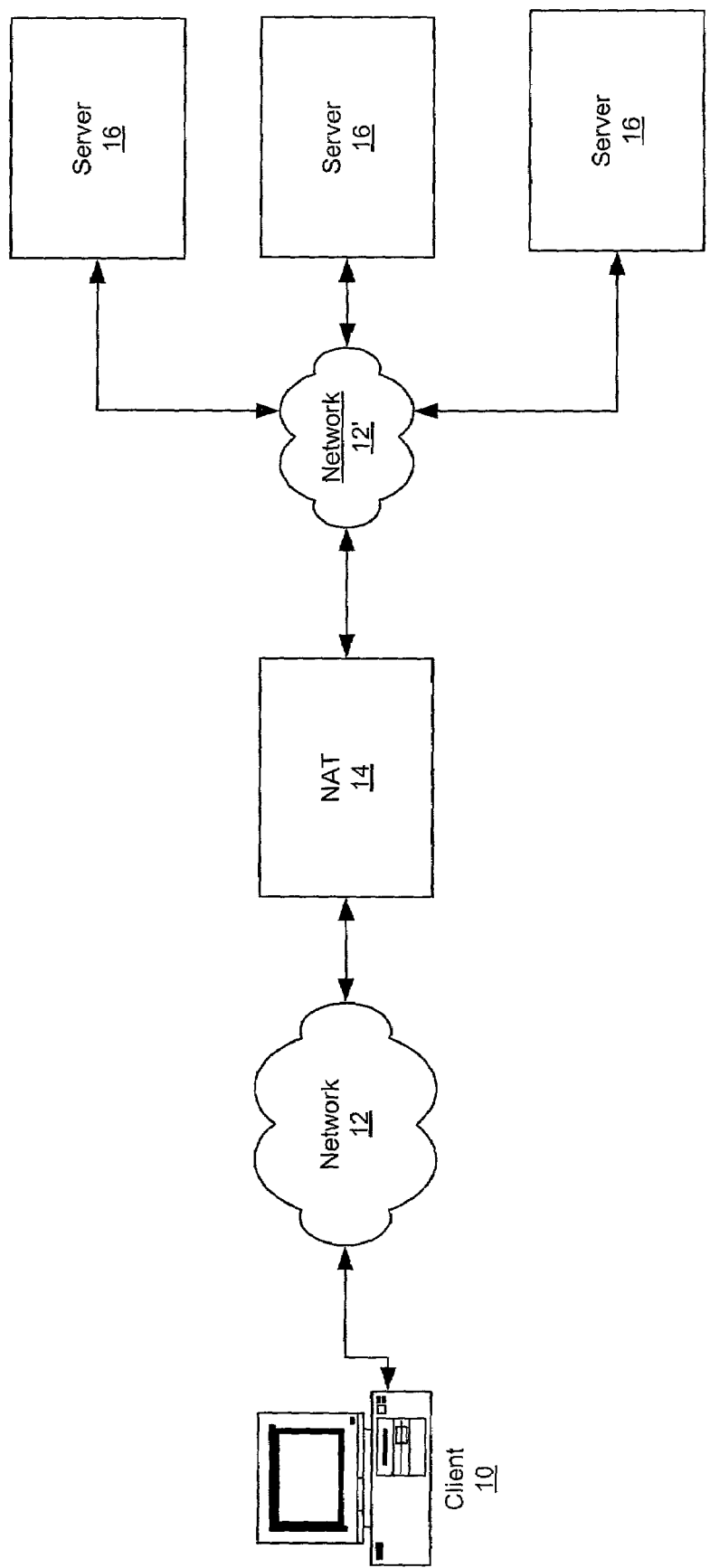
FIG. 1 is block diagram of a conventional network address translation system.
Figure 2:
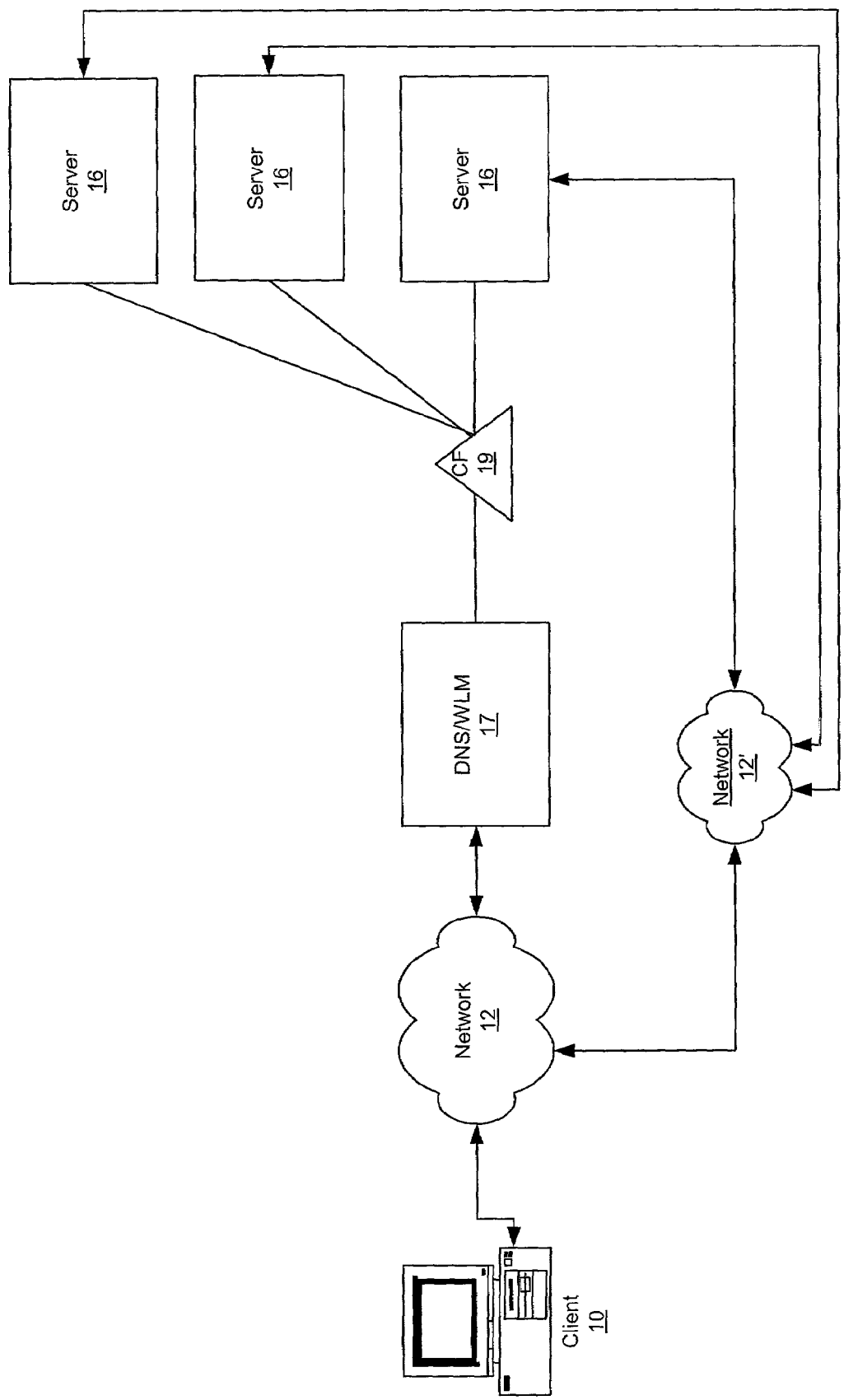
FIG. 2 is block diagram of a conventional DNS/WLM system.
Figure 3:
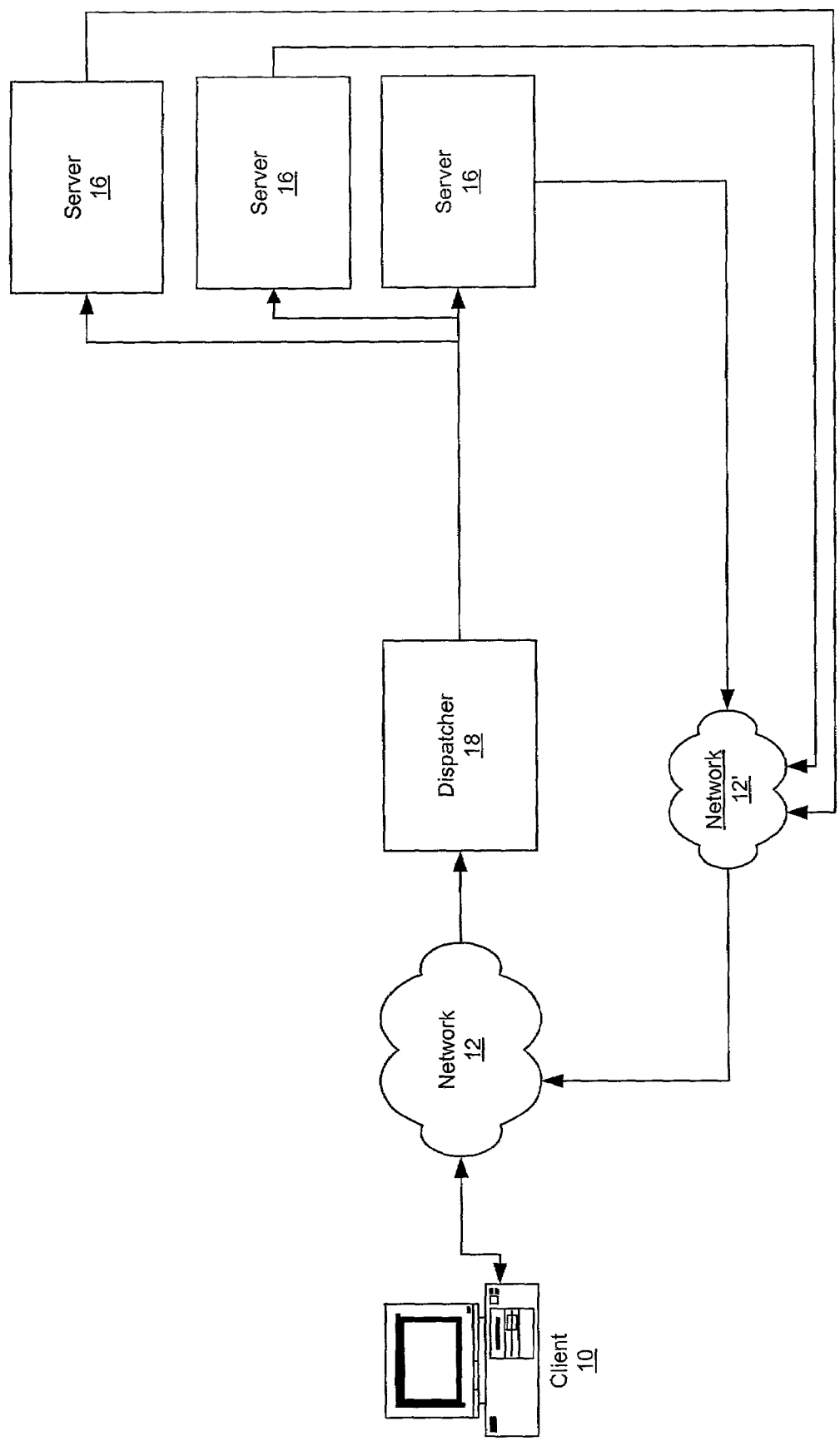
FIG. 3 is block diagram of a conventional dispatcher system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

The present invention can be embodied as systems, methods, or computer program products which allow for end-to-end network security to be provided in a cluster of data processing systems which utilize a common IP address and have workload utilizing the common IP address distributed to data processing systems in the cluster. Such secure network communications may be provided by distributing security associations to target hosts so as to allow the target hosts to process secure distributed communications. By distributing computationally intense security operations, processing load may be better distributed within a cluster of data processing systems.

Embodiments of the present invention will now be described with reference to FIGS. 4 through 11 which are flowchart and block diagram illustrations of operations of protocol stacks incorporating embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and/or block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

Figure 4:
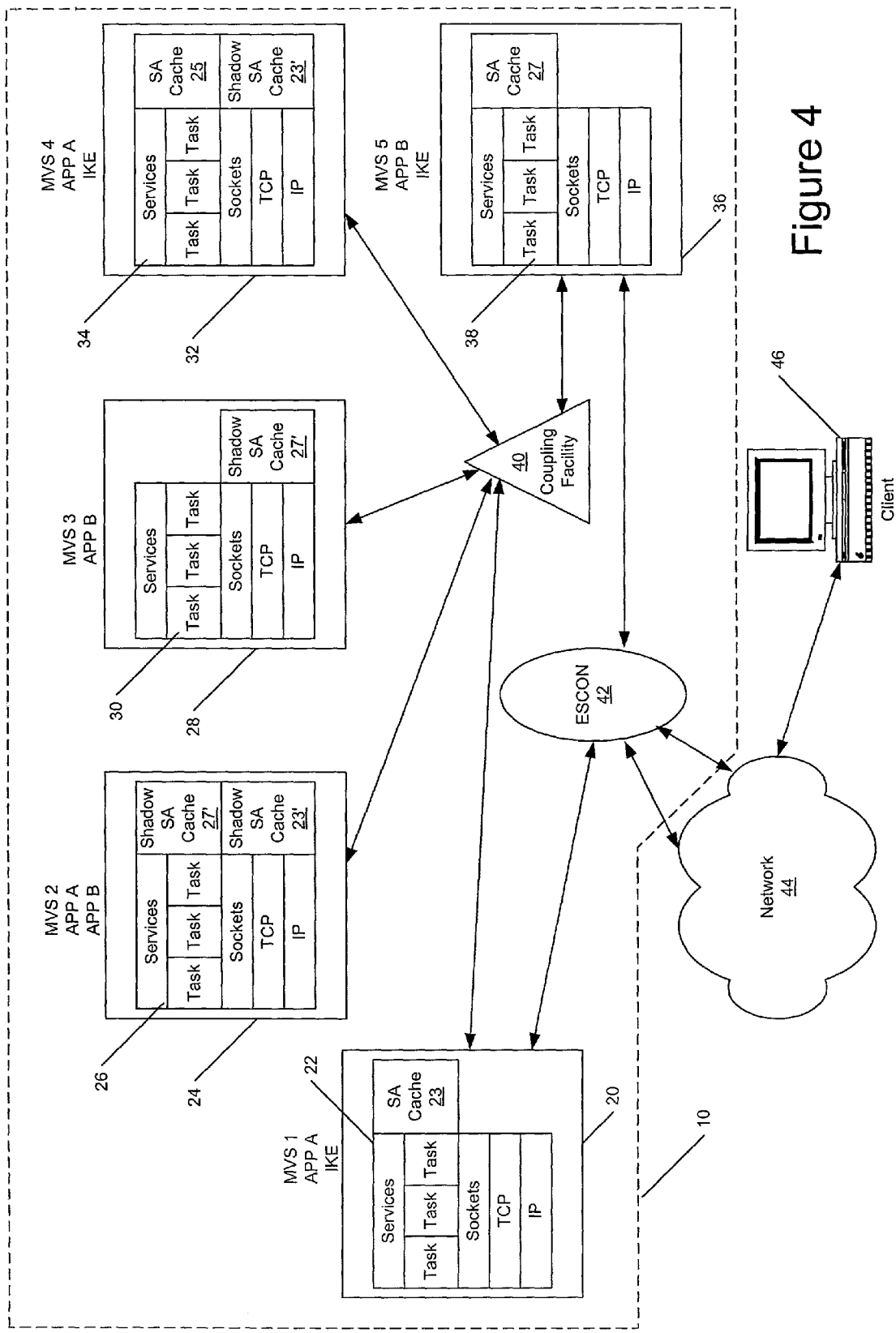
FIG. 4 is a block diagram of a cluster of data processing systems including Sysplex Distributor which incorporate embodiments of the present invention.

Particular exemplary embodiments of the present invention, are illustrated in FIG. 4 which illustrates a Sysplex cluster utilizing Sysplex Distributor. The Sysplex Distributor was provided in OS/390 V2R10 (General Availability of September, 1999) and is described in detail in commonly assigned U.S. patent application Ser. No. 09/640,409, entitled "METHODS, SYSTEMS AND COMPUTER PROGRAM PRODUCTS FOR CLUSTER WORKLOAD DISTRIBUTION", U.S. patent application Ser. No. 09/640,412, entitled "METHODS, SYSTEMS AND COMPUTER PROGRAM PRODUCTS FOR NON-DISRUPTIVELY TRANSFERRING A VIRTUAL INTERNET PROTOCOL ADDRESS BETWEEN COMMUNICATION PROTOCOL STACKS" and U.S. patent application Ser. No. 09/640,438, entitled "METHODS, SYSTEMS AND COMPUTER PROGRAM PRODUCTS FOR FAILURE RECOVERY FOR ROUTED VIRTUAL INTERNET PROTOCOL ADDRESSES", the disclosures of which are incorporated herein by reference as if set forth fully herein.

Sysplex Distributor systems have previously attempted to provide IPSec support by having the IPSec endpoint be a distributing host and a TCP endpoint be the target hosts. However, such a difference may lead to security complexities and inconsistencies within the Sysplex. Such inconsistencies have lead to OS/390 V2R10 requiring that all IPSec traffic not be distributed, thus depriving IPSec traffic of the benefits of distribution provided by the systems of the above referenced patent applications.

In Sysplex Distributor, a single IP address is associated with a plurality of communication protocol stacks in a cluster of data processing systems by providing a routing protocol stack which associates a Virtual IP Address (VIPA) and port with other communication protocol stacks in the cluster and routes communications to the VIPA and port to the appropriate communication protocol stack. VIPAs capable of being shared by a number of communication protocol stacks are referred to herein as "dynamic routable VIPAs" (DVIPA). While the present invention is described with reference to specific embodiments in a System/390 Sysplex, as will be appreciated by those of skill in the art, the present invention may be utilized in other systems where clusters of computers utilize virtual addresses by associating an application or application group rather than a particular communications adapter with the addresses. Thus, the present invention should not be construed as limited to the particular exemplary embodiments described herein.

A cluster of data processing systems is illustrated in FIG. 4 as a cluster of nodes in a Sysplex 10. As seen in FIG. 4, several data processing systems 20, 24, 28, 32 and 36 are interconnected in the Sysplex 10. The data processing systems 20, 24, 28, 32 and 36 illustrated in FIG. 4 may be operating system images, such as MVS images, executing on one or more computer systems. While the present invention will be described primarily with respect to the MVS operating system executing in a System/390 environment, the data processing systems 20, 24, 28, 32 and 36 may be mainframe computers, mid-range computers, servers or other systems capable of supporting dynamic routable Virtual IP Addresses as described herein.

As is further illustrated in FIG. 4, the data processing systems 20, 24, 28, 32 and 36 have associated with them communication protocol stacks 22, 26, 30, 34 and 38, which may be TCP/IP stacks. The communication protocol stacks 26, 30, and 34 have been modified to incorporate shadow SA caches 23', and 27' as described herein for providing security processing of dynamically routed VIPAs at the target host. Also illustrated in FIG. 4 is an SA cache 23 associated with the IKE of MVS 1, an SA cache 25 associated with the IKE of MVS 4 and an SA cache 27 associated with the IKE of MVS 5. Such SA caches may be used with data processing systems having an IKE to negotiate SAs such that SAs owned by the IKE may be stored in the SA cache. For example, SAs negotiated by a local instance of IKE on MVS 1 may be stored in the SA cache 23. If the SAs are associated with a dynamically routed VIPA the SAs may also be stored in the shadow SA cache 23' at potential target hosts for the DVIPA. For example, in FIG. 4, MVS 2 and MVS 4 are associated with the DVIPA of routing communication protocol stack 22 and, therefore, include the shadow SA cache 23'. Similarly, MVS 2 and MVS 3 are associated with the DVIPA of routing communication protocol stack 38 and, therefore, include the shadow SA cache 27'.

The shadow SA caches 23' and 27' may be organized by DVIPA and may contain SA information for connections for which the target hosts is an endpoint. For inbound IPSec traffic, the shadow SA caches 23' and 27' may be accessed by Security Parameter Index (SPI), IPSec protocol and source address. For outbound traffic, the shadow SA caches 23' and 27' may be accessed by Tunnel Name, which may be determined by conventional filter rule lookup on the target host.

As seen in FIG. 4, not all communication protocol stacks in a Sysplex need incorporate both the SA cache 23 and the shadow SA cache 23'. For example, if a communication protocol stack does not support IPSec, the communication protocol stack would not require either cache. Similarly, if the communication protocol stack does not support IPSec for distributed communications as described herein, the communication protocol stack would not require the shadow cache 23'.

As is further seen in FIG. 4, the communication protocol stacks 22, 26, 30, 34 and 38 may communicate with each other through a coupling facility 40 of the Sysplex 10, for example, utilizing XCF messaging. Furthermore, the communication protocol stacks 22 and 38 may communicate with an external network 44 such as the Internet, an intranet, a Local Area Network (LAN) or Wide Area Network (WAN) utilizing the Enterprise System Connectivity (ESCON) 42. Thus, a client 46 may utilize the network 44 to communicate with an application executing on an MVS image in Sysplex 10 through the communication protocol stacks 22 and 38 which may function as routing protocol stacks as described herein.

As is further illustrated in FIG. 4, as an example of utilization of the present invention and for illustration purposes, communication protocol stack 22 which is associated with MVS image MVS 1 which has application APP A executing on MVS image MVS 1 and utilizing communication protocol stack 22 to allow access to, for example, client 46 through network 44. Furthermore, the communication protocol stack 22 is capable of IPSec processing, managing and accessing the SPD and SAD. MVS image MVS 1 also has an instance of the IKE application executing to allow negotiation of IPSec SAs.

Similarly, communication protocol stack 26 is associated with MVS image MVS 2 which has a second instance of application APP A and an instance of application APP B executing on MVS image MVS 2 which may utilize communication protocol stack 26 for communications. Communication protocol stack 30 which is associated with MVS image MVS 3 has a second instance of application APP B executing on MVS image MVS 3 which may utilize communication protocol stack 30 for communications. Communication protocol stack 34 which is associated with MVS image MVS 4 has a third instance of application APP A executing on MVS image MVS 4 which may utilize communication protocol stack 34 for communications. MVS image MVS 4 may also have an instance of the IKE application executing to allow negotiation of IPSec SAs.

Finally, communication protocol stack 38 which is associated with MVS image MVS 5 has a third instance of application APP B executing on MVS image MVS 5 which may utilize communication protocol stack 38 for communications. Furthermore, the communication protocol stack 38 is capable of IPSec processing, managing and accessing the SPD and SAD. MVS image MVS 5 also has an instance of the IKE application executing to allow negotiation of IPSec SAs.

VIPA Distributor allows for protocol stacks which are defined as supporting DVIPAs to share the DVIPA and communicate with network 44 through a routing protocol stack such that all protocol stacks having a server application which is associated with the DVIPA will appear to the network 44 as a single IP address. Such dynamically routable VIPAs may be provided by designating a protocol stack, such as protocol stack 22, as a routing protocol stack. Other protocol stacks are notified of the routing protocol stack. The other protocol stacks then notify the routing protocol stack when an application which binds to the DVIPA is started. Such routing protocol stacks may also provide IPSec processing for the DVIPA as described in commonly assigned and concurrently filed U.S. patent application Ser. No. 09/764,790, entitled "METHODS, SYSTEMS AND COMPUTER PROGRAM PRODUCTS FOR PROVIDING FAILURE RECOVERY OF NETWORK SECURE COMMUNICATIONS IN A CLUSTER COMPUTING ENVIRONMENT", U.S. patent application Ser. No. 09/764,252, entitled "METHODS, SYSTEMS AND COMPUTER PROGRAM PRODUCTS FOR PROVIDING DATA FROM NETWORK SECURE COMMUNICATIONS IN A CLUSTER COMPUTING ENVIRONMENT" and U.S. patent application Ser. No. 09/764,500, entitled "METHODS, SYSTEMS AND COMPUTER PROGRAM PRODUCTS FOR TRANSFERRING SECURITY PROCESSING BETWEEN PROCESSORS IN A CLUSTER COMPUTING ENVIRONMENT", the disclosures of which are incorporated herein by reference as if set forth fully herein.

The communication protocol stacks 22, 26, 30, 34 and 38 may be configured as to which stacks are routing stacks, backup routing stacks and server stacks. Different DVIPAs may have different sets of backup stacks, possibly overlapping. The definition of backup stacks may be the same as that for the VIPA takeover function described in U.S. patent application Ser. No. 09/401,419, entitled "METHODS, SYSTEMS AND COMPUTER PROGRAM PRODUCTS FOR AUTOMATED MOVEMENT OF IP ADDRESSES WITHIN A CLUSTER" which is incorporated herein by reference as if set forth fully herein.

Configuration of a dynamic routable VIPA may be provided by a definition block established by a system administrator for each routing communication protocol stack 22 and 38. Such a definition block is described in the above referenced United States Patent Applications and defines dynamic routable VIPAs for which a communication protocol stack operates as the primary communication protocol stack. Backup protocol stacks may be defined as described in the above referenced applications with reference to the VIPA takeover procedure. Thus, the definition block "VIPA-Dynamic" may be used to define dynamic routable VIPAs. Within the VIPADynamic block, a definition may also be provided for a protocol stack supporting moveable VIPAs. All of the VIPAs in a single VIPADEFine statement may belong to the same subnet, network, or supernet, as determined by the network class and address mask. VIPAs may also be defined as moveable VIPAs which may be transferred from one communication protocol stack to another.

Similarly, within the definitions, a protocol stack may be defined as a backup protocol stack and a rank ((e.g. a number between 1 and 254) provided to determine relative order within the backup chain(s) for the associated dynamic routable VIPA(s). A communication protocol stack with a higher rank will take over the dynamic VIPAs before a communication protocol stack with a lower rank.

Within the VIPADYNamic block, a VIPA may be defined as a dynamic routable VIPA based on a VIPA address and a portlist which is a list of ports for which the DVIPA will apply. Alternatively, all ports for an IP address may be considered as DVIPAs. Also provided in the definition is a list of protocol stacks which will be included as server stacks in routing communications directed to the DVIPA. The IP addresses which define the potential server stacks may be XCF addresses of the protocol stacks or may be designated "ALL." If "ALL" is designated, then all stacks in the Sysplex are candidates for distribution. In addition to the above definitions, a range of IP addresses may be defined as DVIPAs utilizing the VIPARange definition.

Returning to the example of FIG. 4 and utilizing the definitions described in the above referenced applications, for MVS1 to MVS5, the VIPADEFine statements may be:

MVS1: VIPADEFine MOVEable IMMEDiate DVA1
   VIPADISTribute DVA1 PORT 60 DESTIP XCF1, XCF2, XCF4

MVS5: VIPADEFine MOVEable IMMEDiate DVB1
   VIPADISTribute DVB1 PORT 60 DESTIP ALL
   VIPADISTribute DVA1 PORT 60 DESTIP XCF2, XCF3, XCF4

For purposes of illustration, the respective address masks have been omitted because they are, typically, only significant to the routing daemons. In the above illustration, XCF1 is an XCF address of the TCP/IP stack on MVS1, XCF2 is an XCF address of the TCP/IP stack on MVS2 and XCF3 is an XCF address of the TCP/IP stack on MVS4. Note that, for purposes of the present example, definitions for MVS2, MVS3, and MVS4 are not specified. Such may be the case where the protocol stacks for these MVS images are candidate target protocol stacks and are not identified as routing protocol stacks and, therefore, receive their dynamic routable VIPA definitions from the routing protocol stacks. Additional VIPA definitions may also be provided, however, in the interests of clarity, such definitions have been omitted.

Figure 5:
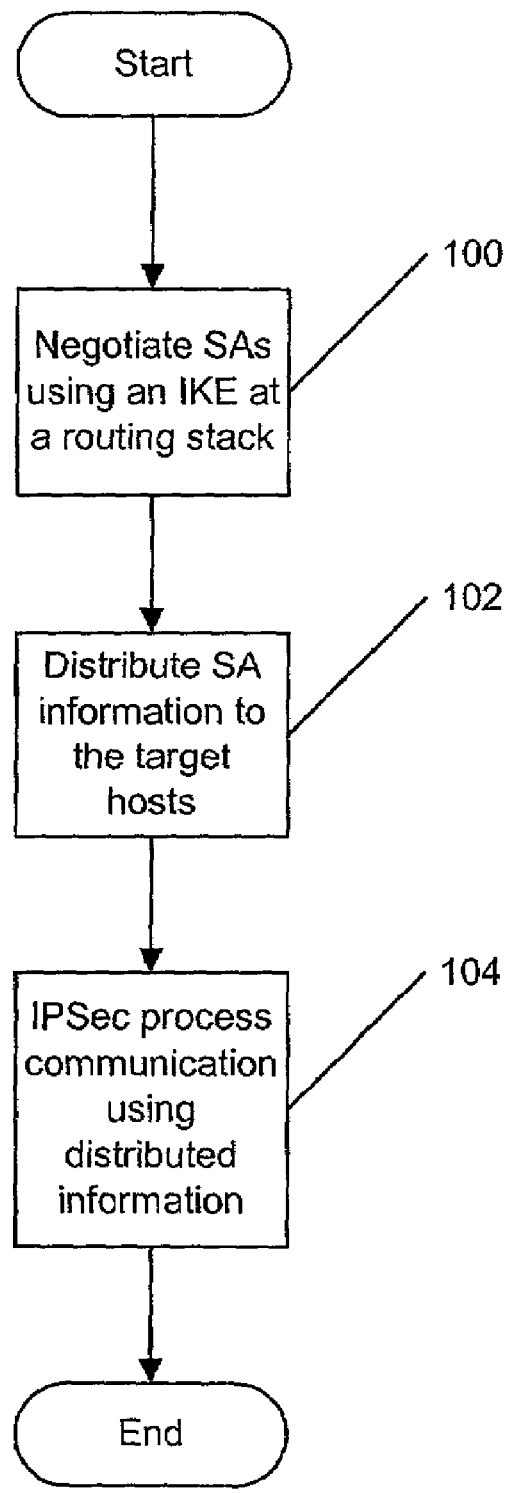
FIG. 5 is a flowchart illustrating operations according to embodiments of the present invention.

Utilizing the above described system configuration as an example, distributed IPSec processing will now be described with reference to FIGS. 5 through 11. FIG. 5 illustrates operations according to embodiments of the present invention. As seen in FIG. 5, an IKE associated with a routing communication protocol stack negotiates an SA for the DVIPA routed by the protocol stack (block 100). This SA information is then distributed to potential target hosts of the DVIPA over a trusted communication link (block 102). IPSec processing for the DVIPA is performed using the distributed information at the target hosts (block 104).

Figure 6:
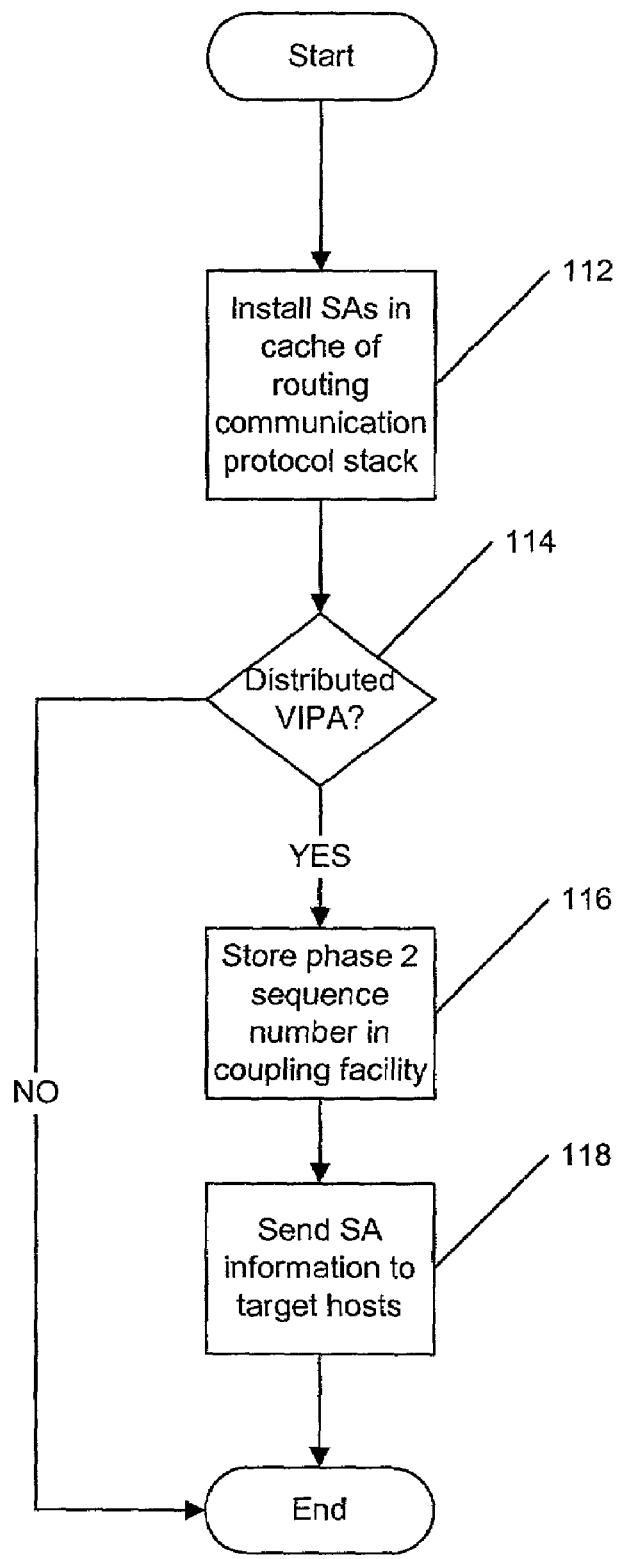
FIG. 6 is a flowchart illustrating operations of a routing communication protocol stack for distribution of IPSec SAs according to embodiments of the present invention.

Operations of a routing communication protocol stack according to embodiments of the present invention when an IPSec SA is negotiated, such as the protocol stacks 22 and 38 in FIG. 4 in the present example, are illustrated in FIG. 6. As seen in FIG. 6, when an IPSec SA is negotiated, IKE installs the SA in the corresponding SA caches 23 and 27 of the corresponding routing communication protocol stacks 22 and 38 (block 112).

If the installed SA information is not for a DVIPA (block 114), operations proceed normally. However, if the installed SA information is for a DVIPA (block 114), the Phase 2 sequence number of the installed SA is stored in the coupling facility (block 116) and the SA and dynamic filter information is sent to the target hosts for the DVIPA (block 118). Such a distribution may be carried out by, for example, broadcasting the information utilizing XCF communications.

In the present example, when an SA associated with DVA1 is installed in the SA cache 23 of the routing communication protocol stack 22, the SA information would be distributed to the communication protocol stacks 26 and 34. When an SA associated with DVB1 was installed in the SA cache 27 of the routing communication protocol stack 38, the SA information would be distributed to the communication protocol stacks 26 and 30.

Figure 7:
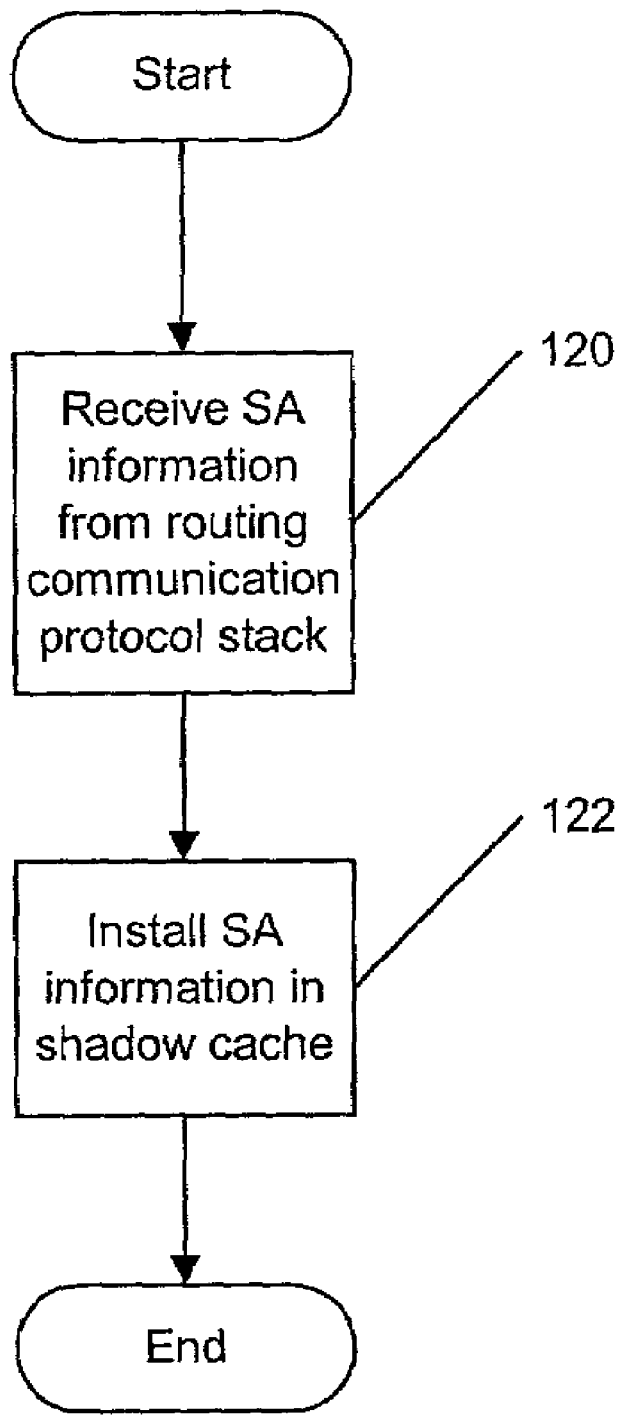
FIG. 7 is a flowchart illustrating operations of a target host communication protocol stack for processing shadow SA information according to embodiments of the present invention.

As seen in FIG. 7, the communication protocol stacks receive the SA information associated with a DVIPA (block 120) and install the SA information in their corresponding shadow SA cache 23' and 27' and the dynamic filter rules in the policy filter (block 122). The shadow SA caches 23' and 27' are used as described herein for storing SA information which is not "owned" by an IKE associated with a communication protocol stack. Thus, for example, the SA information received by the communication protocol stacks of target hosts is placed into the shadow SA cache 23' or 27' corresponding to the DVIPA associated with the SA information because the SA information was not negotiated by an IKE function associated with the target host but was negotiated by an IKE function associated with the routing communication protocol stack for the DVIPA.

Figure 8:
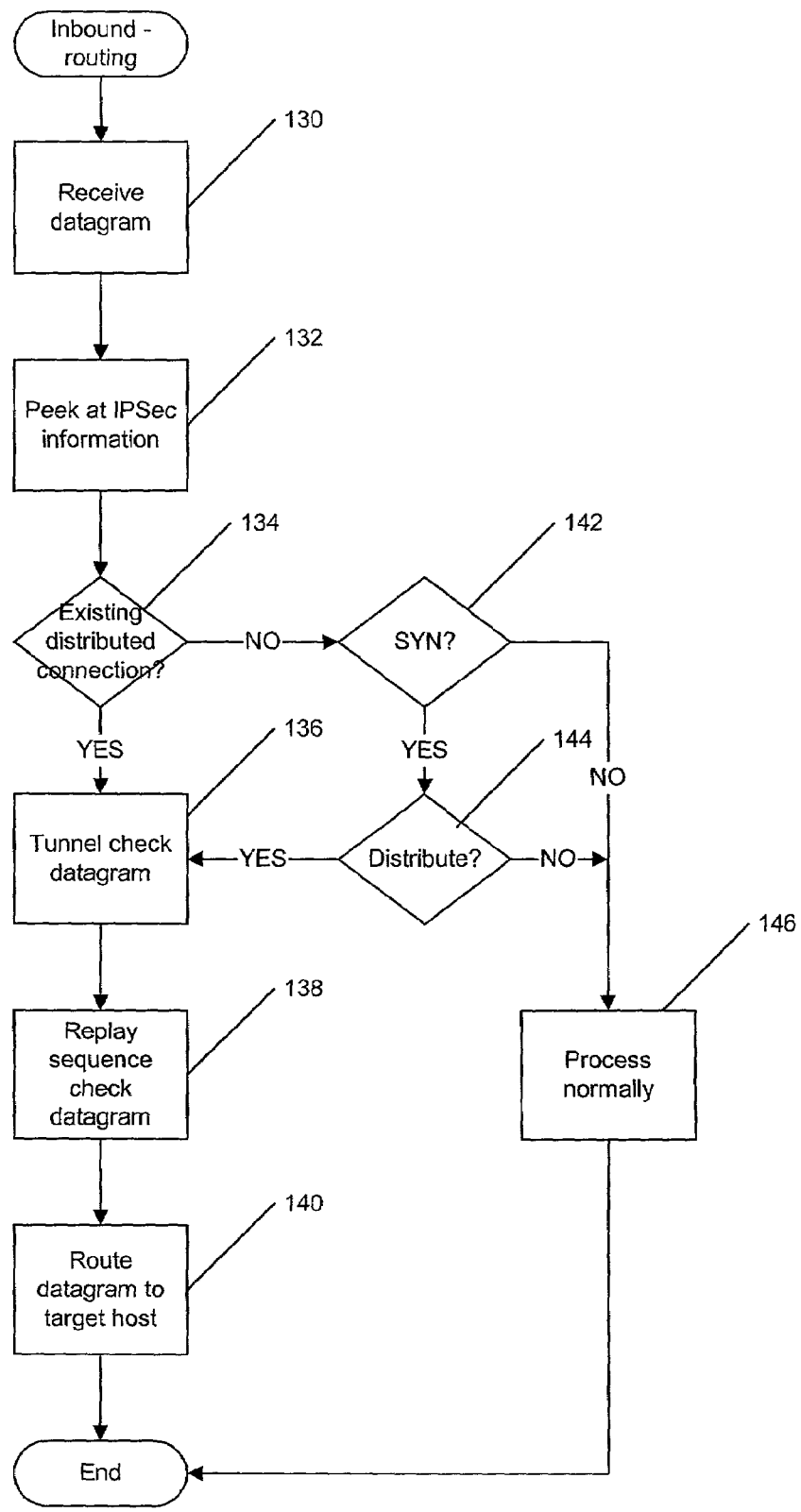
FIG. 8 is a flowchart illustrating operations of a routing communication protocol stack for processing inbound communications according to embodiments of the present invention.

FIG. 8 illustrates operations for routing inbound communications with distributed IPSec process as described herein. As seen in FIG. 8, the routing communication protocol stack receives a datagram which requires IPSec processing (block 130). The routing communication protocol stack peeks at the IPSec information (block 132) to determine if the datagram is for an existing distributed connection (block 134). Such a determination may be made by processing (e.g. decrypting and/or parsing) the datagram to the end of the TCP header and evaluating the information contained therein to determine the source and destination IP address and port. In particular, the peek function may locate an SA using SPI, Protocol and source address. If encrypted, decryption of the datagram is performed to the end of the TCP header. The SA mode may be used to determine the offset to which to decrypt or in IPv6, the decryption may be iterative.

The source and destination addresses and the port may be used to determine if an entry exists in the routing communication protocol stack's distributed connection table (DCT). If such a corresponding entry exists, then the datagram may be considered to be for an existing distributed connection. If the routing communication protocol stack cannot determine if the datagram is for a distributed connection without further IPSec processing, then IPSec processing may be performed by the routing communication protocol stack as described in the commonly assigned and concurrently filed United States Patent Applications identified above.

If the datagram is for an existing distributed connection (block 134), a tunnel check is performed to verify that the datagram was received from the proper tunnel if the routing communication protocol stack is performing inbound filtering (block 136). If the routing communication protocol stack is not performing inbound filtering, the tunnel check may be performed by the target communication protocol stack. A replay sequence check is also performed (block 138). If the tunnel check, if performed, and the replay sequence check are valid, the datagram is forwarded to the target host (block 140). If a tunnel check or replay sequence check fails, the datagram may be discarded.

Returning to block 134, if the datagram is not for an existing distributed connection, the routing communication protocol stack determines if the datagram is a SYN message to establish a connection (block 142). If not, the datagram may be processed normally (block 146). If the datagram is a SYN message (block 142), the routing communication protocol stack determines if the connection is to be distributed to a target host (block 144). Such a determination may be made as described with reference to the VIPA Distributor described in the above referenced United States Patent Applications. For example, the IPSec combinations which may be distributed (referred to as "Crypto Dist" in the table) may include, but is not limited to the following:

| IPSec combination | Mode | Sysplex Dist? | Crypto Dist? | Peek Req'd for inbound | Payload Type | Local IP @ in Outer Header | Local IP @ in Inner Header |
|---|---|---|---|---|---|---|---|
| AH | Transport | Y | Y | N | TCP | DVIPA | N/A |
| (IP,AH, Payload) | | N | N | N | ^TCP, ^ESP | DVIPA | N/A |

-continued

| IPSec combination | Mode | Sysplex Dist? | Crypto Dist? | Peek Req'd for inbound | Payload Type | Local IP @ in Outer Header | Local IP @ in Inner Header |
|---|---|---|---|---|---|---|---|
| AH | Tunnel | Y | Y | N | IP->TCP | DVIPA | DVIPA |
| (IP,AH, IP,Payload) | | N | N | N | IP->TCP | DVIPA | DVIPA |
| | | Y | N note 2 | N | IP->TCP | ^DVIPA | DVIPA |
| | | N | N | N | IP->^TCP, ^ESP | DVIPA | DVIPA |
| ESP | Transport | Y | Y | Y note 1 | TCP | DVIPA | N/A |
| (IP,ESP, Payload) | | N | N | Y | ^TCP | DVIPA | N/A |
| ESP | Tunnel | Y | Y | Y note 1 | IP->TCP | DVIPA | DVIPA |
| (IP,ESP, IP,Payload) | | N | N | Y | IP->TCP | DVIPA | ^DVIPA |
| | | Y | N note 2 | Y | IP->TCP | ^DVIPA | DVIPA |
| | | N | N | Y | IP->^TCP | DVIPA | ^DVIPA |
| Combined AH,ESP | Transport | Y | Y | N note 1 | TCP | DVIPA | N/A |
| (IP,AH,ESP, Payload) | | N | N | Y | ^TCP | DVIPA | N/A |
| Combined AH,ESP | Tunnel | Y | Y | Y note 1 | IP->TCP | DVIPA | DVIPA |
| (IP,AH,ESP, IP,Payload) | | N | N | Y | IP->TCP | DVIPA | ^DVIPA |
| | | Y | N note 2 | Y | IP->TCP | ^DVIPA | DVIPA |
| | | N | N | Y | IP->^TCP | DVIPA | ^DVIPA |

Note 1: If ESP null, payload is not encrypted and therefore peek is not needed.
Note 2: This combination while sysplex distributable, is not expected. Support for this case, may involve "peeking" into non-DVIPA headers to check for distributability.

Also indicated in the above table is whether the datagram will be "peeked" into to determine if it is distributed.

If the SYN message is not for a distributed connection (block 144), normal processing of the SYN is performed (block 146). If the SYN message is for a distributed connection (block 144), then the tunnel check (if inbound filtering is performed) and replay sequence check are performed (block 136 and 138) and, if valid, the datagram is forwarded to the selected target host (block 140).

Optionally, the routing communication protocol stacks may also inbound filter the received datagrams. In such a case, inbound filtering may be bypassed for such datagrams at the target hosts. One mechanism to achieve such a bypass of inbound filtering is for the routing communication protocol stack to inbound filter the received datagrams and then encapsulate the received datagrams into a generic routing encapsulation (GRE) format before forwarding the datagrams to the target hosts. The source and destination address in the outer GRE header may be the IP addresses for the XCF links. Furthermore, the physical link may be matched with the IP addresses of the XCF links to assure that the GRE encapsulated datagram was received from the corresponding physical link. Such a verification may reduce the likelihood of "spoofing." In such a case, the target hosts may bypass inbound filtering for such GRE encapsulated datagrams and decapsulate the encapsulated datagrams for processing.

Figure 9:
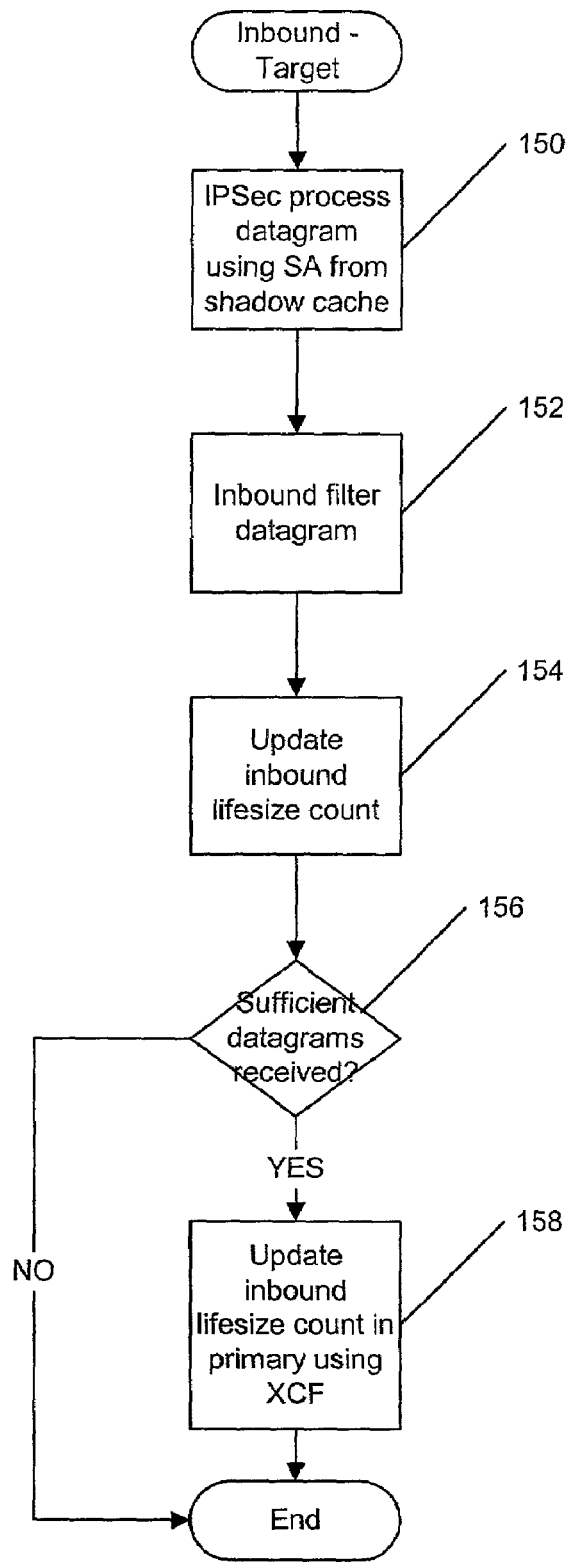
FIG. 9 is a flowchart illustrating operations of a target host communication protocol stack for processing inbound communications according to embodiments of the present invention.

FIG. 9 illustrates operations for processing of inbound datagrams by the target hosts utilizing distributed IPSec processing. As seen in FIG. 9, IPSec processing is performed using SA information from the shadow SA cache 23' or 27' (block 150) and the datagram is inbound filtered (block 152). The inbound lifesize count is also updated to reflect the received and processed datagram (block 154).

To save on communications with the coupling facility, the inbound lifesize count in the IKE of the routing communication protocol stack, which is used by the IKE of the routing communication protocol stack to determine when to refresh the SA, may, optionally, be only periodically updated on a "batch" basis. Such a period may be uniform or non-uniform and may be based on time, the number of processed communications, an amount of processed data or the like. Thus, for example, it may be determined if sufficient datagrams have been received to update the inbound lifesize count in the routing communication protocol stack (block 156). If so, then the inbound lifesize count in the IKE of the routing communication protocol stack may be updated by sending an XCF message to the routing communication protocol stack (block 158). Such a batch update of the lifesize count may be based on a percentage of the total lifesize, for example, an update may occur when the lifesize count in the target host reaches 5% of the total lifesize count.

Alternatively, the threshold for updating the IKE of the routing communication protocol stack may be dynamically determined. For example, the threshold may be established at an initially high level and then decreased if the IKE was not successful in refreshing the SA before its expiration. Similarly, the threshold could be increased until the IKE was not successful or a maximum threshold was reached.

Furthermore, if requested by a policy filter rule on the target host, logging may be performed. In particular embodiments of the present invention, the policy filter rule need not be looked up but the binding information associated with the TCP connection, for example, in the Transmission Control Block (TCB) (which has logging information from the policy filter), may be consulted to determine whether the datagram should be logged. This function may be performed at the TCP layer.

Figure 10:
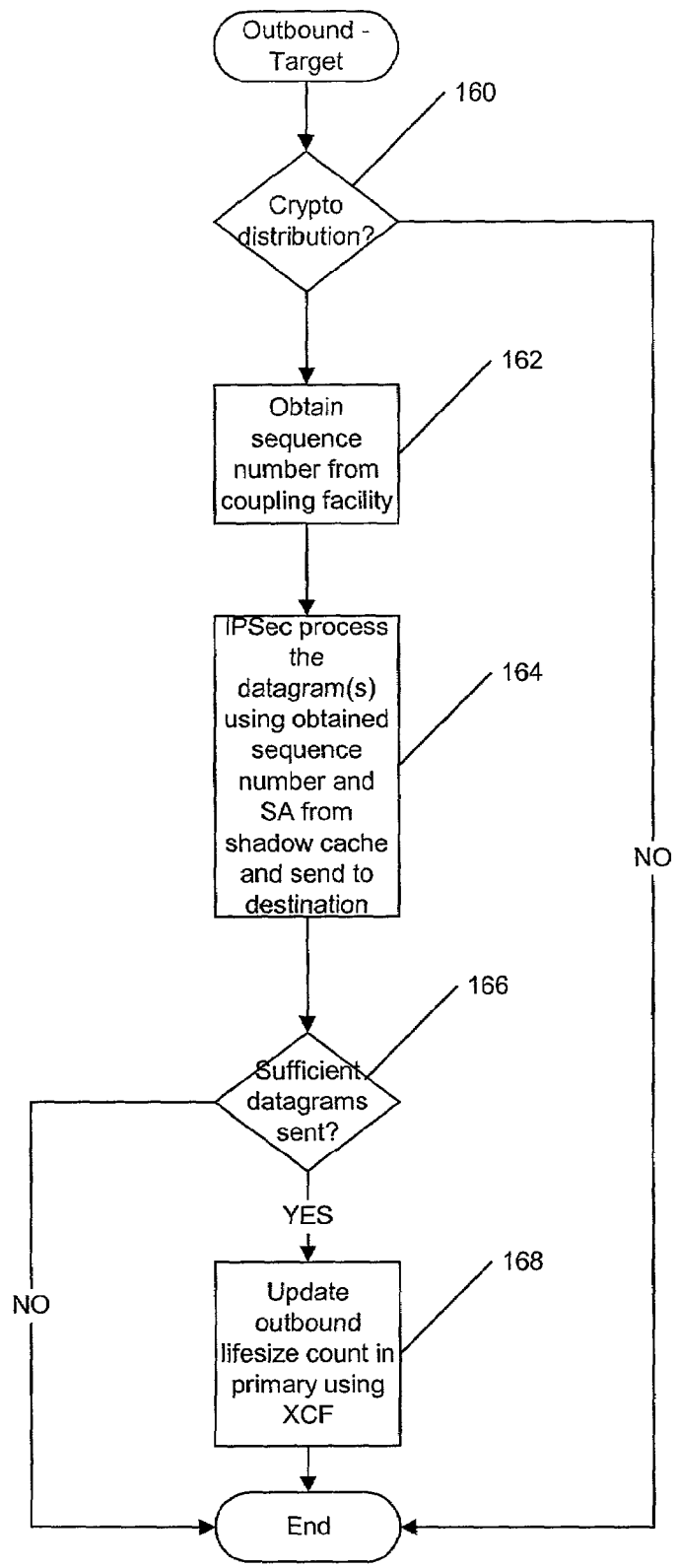
FIG. 10 is a flowchart illustrating operations of a target host communication protocol stack for processing outbound communications according to embodiments of the present invention.

FIG. 10 illustrates operations of a communication protocol stack at a target host for processing outbound datagrams. The communication protocol stack determines if the datagram is for a connection utilizing distributed IPSec processing (block 160). Such a determination may be made by detecting that the dynamic filter rule is associated with an SA in the shadow SA cache 23' or 27'. If the datagram is not for a connection utilizing distributed IPSec processing (block 160), the datagram may be processed normally. Otherwise, the communication protocol stack obtains the IPSec sequence number from the coupling facility (block 162).

The coupling facility provides an updated sequence number. If possible, the communication protocol stack may request multiple sequence numbers, for example, if multiple datagrams are ready to be processed in sequence for an SA. In particular, the IXLIST w/LISTKEYINC call may be used to obtain the sequence number. This call may provide the necessary serialization and may not require IPSec to know the current sequence number in the coupling facility. Thus, by requesting the sequence number, the sequence number may be automatically updated for subsequent datagrams by the current or other communication protocol stacks.

With the obtained sequence number, IPSec processing of the datagram or datagrams may be performed using the SA information from the shadow SA cache 23' and the processed datagrams may be sent to the destination (block 164). Note that the datagrams may be sent directly to the destination without going through the routing communication protocol stack.

As with the inbound lifesize count, the outbound lifesize count of the IKE of the routing communication protocol stack should also be updated so that the SA may be refreshed in a timely manner. Thus, for example, it may be determined if sufficient datagrams have been received to update the outbound lifesize count in the primary (block 166). If so, then the outbound lifesize count in the IKE of the routing communication protocol stack may be updated by sending an XCF message to the routing communication protocol stack (block 168). Such a periodic or batch update of the outbound lifesize may have a uniform or non-uniform period and may be based on time, the number of processed communications, an amount of processed data or the like. Furthermore, the batch update may be based on a percentage of the total outbound lifesize, for example, an update may occur when the outbound lifesize count in the target host reaches 5% of the total outbound lifesize count.

Alternatively, the threshold for updating the IKE of the routing communication protocol stack may be dynamically determined. For example, the threshold may be established at an initially high level and then decreased if the IKE was not successful in refreshing the SA before the SA expires. Similarly, the threshold could be increased until the IKE was not successful or a maximum threshold was reached.

Figure 11:
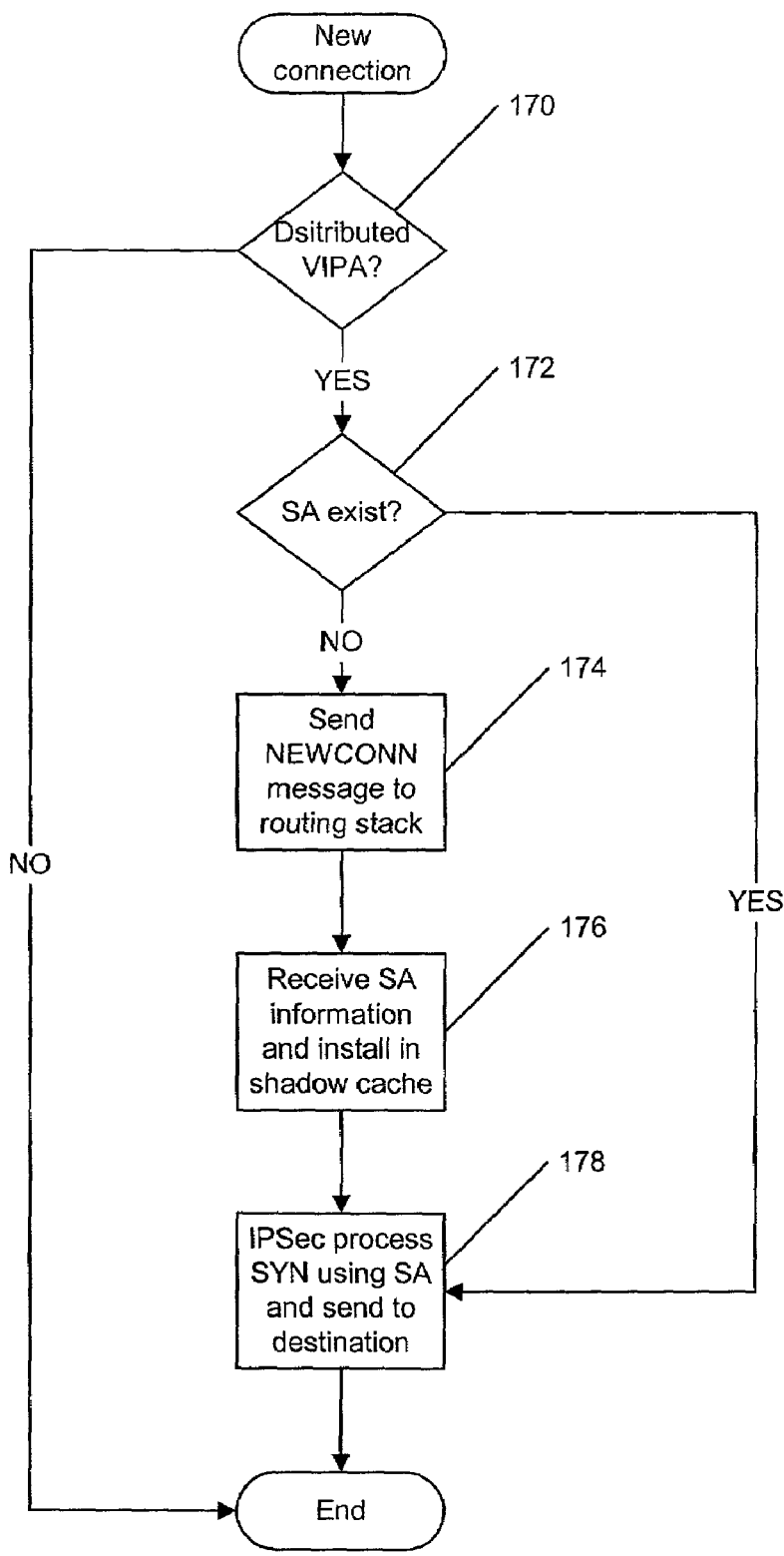
FIG. 11 is a flowchart illustrating operations for establishing a target host originated connection according to embodiments of the present invention.

FIG. 11 illustrates the operations of the target host communication protocol stack for initiation of a connection utilizing distributed IPSec according to embodiments of the present invention. When a new connection is requested, the communication protocol stack determines if the connection is for a DVIPA (block 170). Such a determination may be made based on a VIPAList distributed by the routing communication protocol stack. If the connection is not for a DVIPA, then operations continue in a conventional manner.

If the connection is for a DVIPA (block 170), it is determined if an SA exists for the connection (block 172). Such a determination may be made based on the contents of the shadow SA cache 23' or 27'. If an SA already exists (block 172), then operations may proceed as described in FIG. 10. If an SA does not exist (block 172), the communication protocol stack sends a NEWCONN message to the routing communication protocol stack to request that the IKE of the routing communication protocol stack negotiate an SA for the connection (block 174). When the SA is negotiated, it is distributed to the communication protocol stack of the target host which receives the SA information and installs it in its shadow SA cache 23' or 27' (block 176). The communication protocol stack of the target host uses the received SA information to IPSec process the SYN message and send it to its destination (block 178).

In the embodiments described above, error logging may be performed by the system detecting the error. Furthermore, when a distributed SA is terminated, it may be removed from the shadow SA cache 23' or 27' by direction of the routing communication protocol stack associated with the IKE which negotiated the SA. Thus, for example, a delete SA instruction to the IKE would result in the SA associated with the instruction being removed from the shadow SA cache 23' or 27' of the target hosts.

In the event of failure and takeover by a backup routing communication protocol stack or movement of ownership of a dynamic VIPA to a new routing communication protocol stack, the shadow SA cache 23' or 27' for the dynamic VIPA may be removed and rebuilt on the target hosts with the newly negotiated SA's by the new routing communication protocol stack.

As described herein, communications between the routing communication protocol stacks and the target communication protocol stacks are carried out over a trusted communication link and, therefore, need not use the network security. Such a trusted communication link may be provided, for example, by the interconnections between the data processing systems when co-located in a physically secure environment, a logically secure environment or both. For example, a physically secure environment may be provided by a local area network in a secure building. A logically secure environment may be provided by, for example, the cross coupling facility (XCF) in an OS/390 Sysplex such that the communications between the routing communication protocol stacks and the target communication protocol stacks are provided using XCF links. As will be appreciated by those of skill in the art, the XCF links may be logically secure or both logically and physically secure. Similarly, encryption could also be provided for communications between data processing systems in the cluster such that the communications could be transmitted over a non-secure transmission media. As will be appreciated by those of skill in the art in light of the present disclosure, other trusted mechanisms for communications within the cluster of data processing systems may also be utilized.

While the present invention has been described with respect to the VIPA distribution function as a part of the communication protocol stack, as will be appreciated by those of skill in the art, such functions may be provided as separate functions, objects or applications which may cooperate with the communication protocol stacks. Furthermore, the present invention has been described with reference to particular sequences of operations. However, as will be appreciated by those of skill in the art, other sequences may be utilized while still benefitting from the teachings of the present invention. Thus, while the present invention is described with respect to a particular division of functions or sequences of events, such divisions or sequences are merely illustrative of particular embodiments of the present invention and the present invention should not be construed as limited to such embodiments.

Furthermore, while the present invention has been described with reference to particular embodiments of the present invention in a System/390 environment, as will be appreciated by those of skill in the art, the present invention may be embodied in other environments and should not be construed as limited to System/390 but may be incorporated into other systems, such as a Unix or other environments, by associating applications or groups of applications with an address rather than a communications adapter. Thus, the present invention may be suitable for use in any collection of data processing systems which allow sufficient communication to all of the systems for the use of dynamic virtual addressing. Accordingly, specific references to System/390 systems or facilities, such as the "coupling facility," "ESCON," "Sysplex" or the like should not be construed as limiting the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of providing Internet Protocol Security (IPSec) to a plurality of target hosts in a cluster of data processing systems which communicate with a network through a routing communication protocol stack utilizing a dynamically routable Virtual Internet Protocol Address (DVIPA) for communications from the plurality of target hosts, the method comprising:
   negotiating security associations (SAs) associated with the DVIPA utilizing an Internet Key Exchange (IKE) component associated with the routing communication protocol stack;
   distributing information about the negotiated SAs to the target hosts to allow the target hosts to perform IPSec processing of communications to the network utilizing the negotiated SAs; and
   IPSec processing the communications to the network utilizing the distributed SA information at communication protocol stacks at respective ones of the plurality of target hosts.

2. A method according to claim 1, further comprising the step of storing the distributed information in a shadow SA caches at the target hosts.

3. A method according to claim 2, wherein the step of IPSec processing outbound communications comprises the steps of:
   locating an SA stored in the shadow SA cache which is associated with the outbound communication; and
   IPsec processing the outbound communication utilizing the located SA.

4. A method according to claim 3, further comprising sending the processed outbound communication to the network without routing the outbound communication through the routing communication protocol stack.

5. A method according to claim 3, further comprising the step of obtaining an IPSec sequence number associated with the located SA; and
   wherein the step of IPsec processing the outbound communication utilizing the located SA further comprises the step of IPsec processing the outbound communication utilizing the located SA and the obtained IPSec sequence number.

6. A method according to claim 5, wherein the step of obtaining an IPSec sequence number comprises obtaining an IPSec sequence number from a coupling facility.

7. A method according to claim 5, wherein the step of obtaining an IPSec sequence number comprises the step of obtaining IPSec sequence numbers for a plurality of outbound communications from a communication protocol stack at a respective one of the target hosts.

8. A method according to claim 3, further comprising the step of providing an outbound lifesize count to the routing communication protocol stack.

9. A method according to claim 8, wherein the IKE associated with the routing communication protocol stack refreshes the SAs associated with the DVIIPA based on the outbound lifesize count.

10. A method according to claim 8, wherein the step of providing an outbound lifesize count comprises the step of sending a cross coupling facility (XCF) message identifying the outbound lifesize count to the routing communication protocol stack.

11. A method according to claim 10, wherein the step of sending an XCF message identifying the outbound lifesize count comprises the step of periodically sending a XCF message identifying the outbound lifesize count for a plurality of IPSec processed communications for a routing communication protocol stack for a respective one of the target hosts.

12. A method according to claim 11, wherein the plurality of IPSec processed communications comprises a percentage of a total lifesize count associated with an SA.

13. A method according to claim 12, further comprising the step of dynamically establishing the percentage of the total lifesize count based on whether the IKE has previously refreshed the SA prior to expiration of a lifesize count threshold associated with the SA.

14. A system for providing Internet Protocol Security (IPSec) to a plurality of target hosts in a cluster of data processing systems which communicate with a network through a routing communication protocol stack utilizing a dynamically routable Virtual Internet Protocol Address (DVIPA) for communications from the plurality of target hosts, comprising:
   means for negotiating security associations (SAs) associated with the DVIPA utilizing an Internet Key Exchange (IRE) component associated with the routing communication protocol stack;
   means for distributing information about the negotiated SAs to the target hosts to allow the target hosts to perform IPSec processing of communications to the network utilizing the negotiated SAs; and
   means for IPSec processing the communications to the network utilizing the distributed SA information at communication protocol stacks at respective ones of the plurality of target hosts.

15. A system according to claim 14, further comprising means for storing the distributed information in a shadow SA caches at the target hosts.

16. A system according to claim 15, wherein the means for IPSec processing outbound communications comprises:
   means for locating an SA stored in the shadow SA cache which is associated with the outbound communication; and
   means for IPsec processing the outbound communication utilizing the located SA.

17. A system according to claim 16, further comprising means for obtaining an IPSec sequence number associated with the located SA; and
   wherein the means for IPsec processing the outbound communication utilizing the located SA further comprises means for liPsec processing the outbound communication utilizing the located SA and the obtained IPSec sequence number.

18. A method according to claim 17, wherein the means for obtaining an IPSec sequence number comprises means for obtaining an IPSec sequence number from a coupling facility.

19. A system according to claim 17, wherein the means for obtaining an IPSec sequence number comprises means for obtaining JPSec sequence. numbers for a plurality of outbound communications from a communication protocol stack at a respective one of the target hosts.

20. A system according to claim 16, further comprising means for providing an outbound lifesize count to the routing communication protocol stack.

21. A system according to claim 20, wherein the means for providing an outbound lifesize count comprises means for periodically sending a cross coupling facility (XCF) message identifying the outbound lifesize count for a plurality of IPSec processed communications for a routing communication protocol stack for a respective one of the target hosts.

22. A system according to claim 21, wherein the plurality of IPSec processed communications comprises a percentage of a total lifesize count associated with an SA.

23. A system according to claim 22, further comprising means for dynamically establishing the percentage of the total lifesize count based on whether the IKE has previously refreshed the SA prior to expiration of a lifesize count threshold associated with the SA.

24. A computer program product for providing Internet Protocol Security (IPSec) to a plurality of target hosts in a cluster of data processing systems which communicate with a network through a routing communication protocol stack utilizing a dynamically routable Virtual Internet Protocol Address (DVIPA) for communications from the plurality of target hosts, comprising:
a computer readable medium having computer readable program code embodied therein, the computer readable program code comprising:
computer program code which negotiates security associations (SAs) associated with the DVIPA utilizing an Internet Key Exchange (IKE) component associated with the routing communication protocol stack;
computer program code which distributing information about the negotiated SAs to the target hosts to allow the target hosts to perform IPSec processing of communications to the network utilizing the negotiated SAs; and
computer program code which lPSec processes the communications to the network utilizing the distributed SA information at communication protocol stacks at respective ones of the plurality of target hosts.

25. A computer program product according to claim 24, further comprising computer program code which stores the distributed information in a shadow SA caches at the target hosts.

26. A computer program product according to claim 25, wherein the computer program code which IPSec processes outbound communications comprises:
computer program code which locates an SA stored in the shadow SA cache which is associated with the outbound communication; and
computer program code which IPSec processes the outbound communication utilizing the located SA.

27. A computer program product according to claim 26, further comprising computer program code which obtains an IPSec sequence number associated with the located SA; and
wherein the computer program code which IPsec processes the outbound communication utilizing the located SA further comprises computer program code which IPsec processes the outbound communication utilizing the located SA and the obtained IPSec sequence number.

28. A computer program product according to claim 27, wherein the computer program code which obtains an IPSec sequence number comprises computer program code which obtains an IPSec sequence number from a coupling facility.

29. A computer program product according to claim 27, wherein the computer program code which obtains an IPSec sequence number comprises computer program code which obtains IPSec sequence numbers for a plurality of outbound communications from a communication protocol stack at a respective one of the target hosts.

30. A computer program product according to claim 26, further comprising computer program code which provides an outbound lifesize count to the routing communication protocol stack.

31. A computer program product according to claim 30, wherein the computer program code which provides an outbound lifesize count comprises computer program code which periodically sends a cross coupling facility (XCF) message identifying the outbound lifesize count for a plurality of IPSec processed communications for a routing communication protocol stack for a respective one of the target hosts.

32. A computer program product according to claim 31, wherein the plurality of IPSec processed communications comprises a percentage of a total lifesize count associated with an SA.

33. A computer program product according to claim 32, further comprising computer program code which dynamically establishes the percentage of the total lifesize count based on whether the IKE has previously refreshed the SA prior to expiration of a lifesize count threshold associated with the SA.

* * * * *